F. C. BRUNHOUSE.
SPEED CHANGING MECHANISM.
APPLICATION FILED JAN. 13, 1909.

936,300.

Patented Oct. 12, 1909.

F'derick C. Brunhouse
Inventor

Witnesses
Ralph E. Brunhouse

UNITED STATES PATENT OFFICE.

FREDERICK C. BRUNHOUSE, OF PHILADELPHIA, PENNSYLVANIA.

SPEED-CHANGING MECHANISM.

936,300.

Specification of Letters Patent.   Patented Oct. 12, 1909.

Application filed January 12, 1909. Serial No. 472,034.

*To all whom it may concern:*

Be it known that I, FREDERICK C. BRUNHOUSE, a citizen of the United States, residing in Philadelphia, in the county of Philadelphia and State of Pennsylvania, have invented certain new and useful Improvements in Speed-Changing Mechanisms, of which the following is a specification.

My invention relates to speed changing mechanisms, designed for vehicles, where variable speeds are required.

My object is to provide a device of this character wherein the mechanism for the forward speeds and that for the reverse are independent and individual and are combined and arranged in a new and novel manner. My aim is to simplify this combination so as to obtain compactness, durability, effectiveness and ease of operation. This I accomplish by the means herein described and shown on the accompanying drawing.

Figure 1:
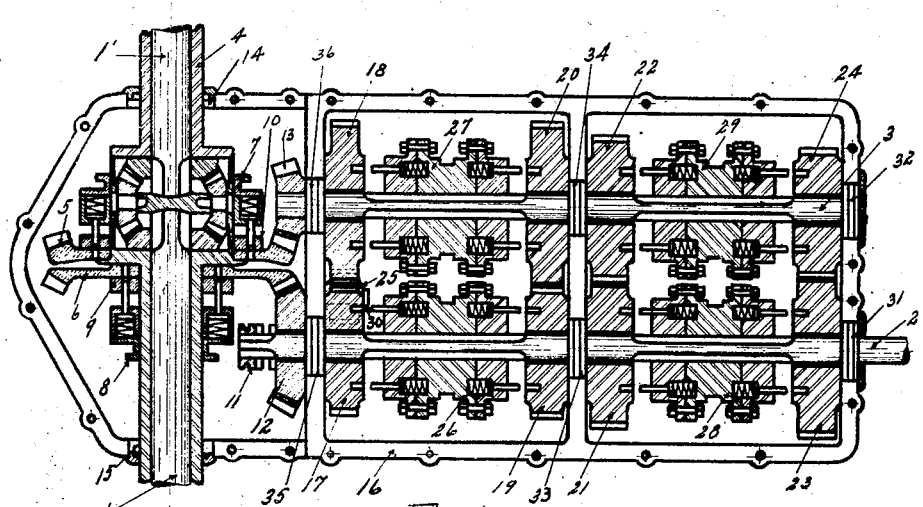
Figure 2:
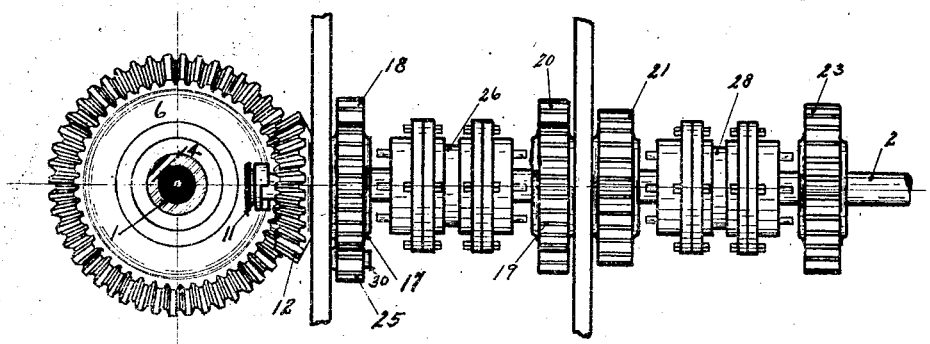

Figure 1 is a horizontal section of the entire mechanism inclosed in its casing. Fig. 2 is a side elevation of the mechanism shown in Fig. 1.

In Fig. 1, 1, 1' is the rear axle of the vehicle where variable speeds are required, said rear axle being formed in two parts connected by a differential mechanism in the usual manner. 2 is the power shaft, 3 is an auxiliary shaft through which the power is transmitted from power shaft 2, by means of a plurality of gears mounted to run free on the power shaft and auxiliary shaft, to the driving gear 5. 4 is the differential case, which is rotatably mounted in the bearings 14 and 15, in the casing 16. Upon the differential case 4 are rotatably mounted free the driving gears 5 and 6, which are held in place by collars 9 and 10 secured to the differential case. The spring-pin clutches 7 and 8 are rotatably mounted free on the differential case to be slid to and fro thereon by a lever, (lever not shown) adapted to engage either of said driving gears 5 and 6 as required. The pinion 12 is rotatably mounted free on the end of power shaft 2, and is constantly in mesh with driving gear 6, and is brought into operation by clutch 11, slidably mounted on the end of power shaft 2. The pinion 13 is securely mounted on the end of auxiliary shaft 3 and remains constantly in mesh with the driving gear 5. The gears 17, 18, 19, 20, 21, 22, 23 and 24 are mounted free on the power shaft 2 and auxiliary shaft 3 and are brought into engagement as required by the double faced spring-pin clutches 26, 27, 28 and 29 which are slidably mounted on the power shaft 2 and auxiliary shaft 3. Throughout this mechanism any other style of clutch or clutch elements can be substituted for the spring-pin clutches. 25 is a small pinion mounted on pin 30 securely mounted in a boss in the casing 16, to transmit the power from gear 17 to gear 18. The bearings 31, 32, 33, 34, 35 and 36 in casing 16, support shaft 2 and auxiliary shaft 3.

In my improved speed changing mechanism as shown in Fig. 1, the power shaft 2 and auxiliary shaft 3 are not broken, all the gears mounted thereon are constantly in mesh with the one opposite it, and so arranged in pairs on the said power shaft and said auxiliary shaft, with double faced clutch elements slidably mounted on said power shaft and said auxiliary shaft between each two pairs of said gears, that only the pair of gears required to produce the speed desired can be used at any one time, all the remaining pairs of gears to produce the other variable speeds being at rest. The entire mechanism is operated by one lever of the selective type, each speed being independent and individual, thus eliminating the extraordinary wearing and positively prevents stripping of gears.

Having thus described the component parts of my speed changing mechanism, I will now describe the manner in which the various speeds are obtained. In the drawing the parts required to produce the variable speeds are disengaged.

To obtain the first speed forward, the clutch 7 is brought into engagement with driving gear 5 and the clutches 26 and 27 are brought into engagement with the gears 19 and 20, the power shaft 2 being in revolution, the power is then transmitted through gear 19 on power shaft 2 to gear 20 on auxiliary shaft 3 and auxiliary shaft 3 in turn transmits the power through pinion 13 to driving gear 5, so that the rotation of the driving gear 5 rotates the axle 1, 1' of the vehicle and produces the first or low speed forward. While the parts above described are thus engaged, the other parts are at rest.

To obtain the first speed forward, the clutch 7 remains in engagement with driving gear 5, but clutches 26 and 27 are disengaged from gears 19 and 20, and clutches 28 and 29 are brought into engagement with gears 21 and 22, the power is then transmitted as before described to driving gear 5, which in like manner produces the second speed forward, meanwhile all the other parts are at rest.

The third speed forward is obtained by permitting clutch 7 to remain in engagement with driving gear 5 and disengaging clutches 28 and 29 from gears 21 and 22 and bringing the said clutches into engagement with gears 23 and 24, the power is then transmitted as before described to driving gear 5, which in like manner produces the third speed forward, all the other parts being at rest.

The fourth speed forward is obtained by disengaging clutch 7 from driving gear 5, and disengaging clutches 28 and 29 from gears 23 and 24, and bringing clutch 8 into engagement with driving gear 6 and clutch 11 into engagement with pinion 12 on power shaft 2, the power shaft 2 being in revolution, the power is transmitted through pinion 12 to driving gear 6, so that the rotation of driving gear 6 rotates the axle 1, 1' of the vehicle and produces the fourth or high speed forward, all the other parts of the mechanism being at rest. The fourth speed forward just described can be eliminated from the said speed changing mechanism, by discarding the driving gear 6, the clutch 8 and the collar 9 mounted on the differential case and the clutch 11 and pinion 12 mounted on the power shaft and still obtain the three speeds forward and the reverse as previously described by securely mounting the driving gear 5 on the differential case, instead of bringing it into engagement by clutch 7 and collar 10 as described. Any additional number of speeds forward can be obtained by the principle employed herein.

It now remains to describe the reverse, disengage clutch 8 from driving gear 6, and clutch 11 from pinion 12, and bring into engagement clutch 7 with driving gear 5, and clutch 26 and 27 into engagement with gears 17 and 18, the power is then transmitted through gear 17 on shaft 2, by pinion 25 on pin 30 mounted in boss in casing 16, to gear 18 on auxiliary shaft 3, auxiliary shaft 3 in turn transmits the power through pinion 13 to driving gear 5, which in turn transmits the power to axle 1, 1' of the vehicle and produces the reverse. While the parts described are thus engaged, the other parts are at rest.

What I claim as my invention and desire to secure by Letters Patent is:—

1. In a speed changing mechanism, a two-part axle, differential mechanism operatively connecting the same, a differential case inclosing said differential mechanism and two-part axle, a gear casing in which said differential case is rotatably mounted, clutch elements furnished with spring-pressed clutch pins mounted free upon said differential case, gears mounted free upon said differential case and furnished with clutch seats adapted to receive said clutch pins, collars securely mounted on said differential case and arranged between said clutch elements and said free gears and having clutch seats adapted to receive the clutch pins, a power shaft, a pinion mounted free on said power shaft and constantly engaging one of the free gears on said differential case, a clutch element slidably mounted on said power shaft adapted to engage said pinion, double faced clutch elements slidably mounted on the power shaft and furnished with spring-pressed clutch pins, gears mounted free on said power shaft and provided with seats adapted to receive said clutch pins, an auxiliary shaft, a pinion securely mounted on said auxiliary shaft and constantly engaging the other of the free gears on said differential case, double faced clutch elements slidably mounted on the auxiliary shaft and furnished with spring-pressed clutch pins, gears mounted free on said auxiliary shaft and furnished with seats adapted to receive said clutch pins, the said gears of variable diameters to produce the variable speeds being arranged on the power shaft and on the auxiliary shaft in pairs opposite each other and constantly in mesh, a gear mounted free on the power shaft and furnished with clutch seats adapted to be engaged by one of said clutch elements on the power shaft, a gear mounted free on the auxiliary shaft opposite the gear on the power shaft and furnished with clutch seats adapted to be engaged by one of said clutch elements on the auxiliary shaft, a shaft pin securely mounted in a boss of the gear casing, a pinion mounted on said shaft pin and constantly in mesh with said gear on the power shaft and with said gear on the auxiliary shaft, substantially as described.

2. In a speed changing mechanism, the combination with a two-part axle, of a differential mechanism operatively connecting the same, a differential case inclosing said differential mechanism and two part axle, a gear casing in which said differential case is rotatably mounted, clutch elements mounted free on said differential case having spring-pressed clutch pins, gears mounted free on said differential case with clutch seats adapted to receive said clutch pins, collars securely mounted on said differential case and arranged between said clutch elements and said free gears and having clutch seats adapted to receive the clutch pins, a power shaft and an auxiliary shaft, pinions on said power shaft and on said auxiliary shaft and constantly in mesh with the free gears on the differential case, a clutch element slidably mounted on the power shaft adapted to engage the pinion on the power shaft, a plurality of gears mounted free on the power shaft and on the auxiliary shaft having clutch seats and of variable diameters to produce the variable speeds being arranged on the power shaft and on the auxiliary shaft in pairs opposite each other and constantly in mesh, clutch elements slidably mounted on said power shaft and on said auxiliary shaft adapted to engage the gears, a gear mounted free on the power shaft and a gear mounted free on the auxiliary shaft opposite the gear on the power shaft having clutch seats adapted to be engaged by certain of the said clutch elements on the power shaft and on the auxiliary shaft, a shaft pin securely mounted in a boss of the gear casing, a pinion mounted on said shaft pin and constantly in mesh with the gear on the power shaft and the gear on the auxiliary shaft, substantially as described.

In testimony whereof I herewith affix my signature in the presence of two witnesses.

FREDERICK C. BRUNHOUSE.

Witnesses:
- RALPH E. BRUNHOUSE.
- ALLEN M. STEARNE.